July 16, 1940.　　　　M. B. LUTTBEG　　　　2,208,038
ACCORDION
Filed Feb. 10, 1938　　　　6 Sheets-Sheet 1

Inventor
Max B. Luttbeg
By William Janus
Atty.

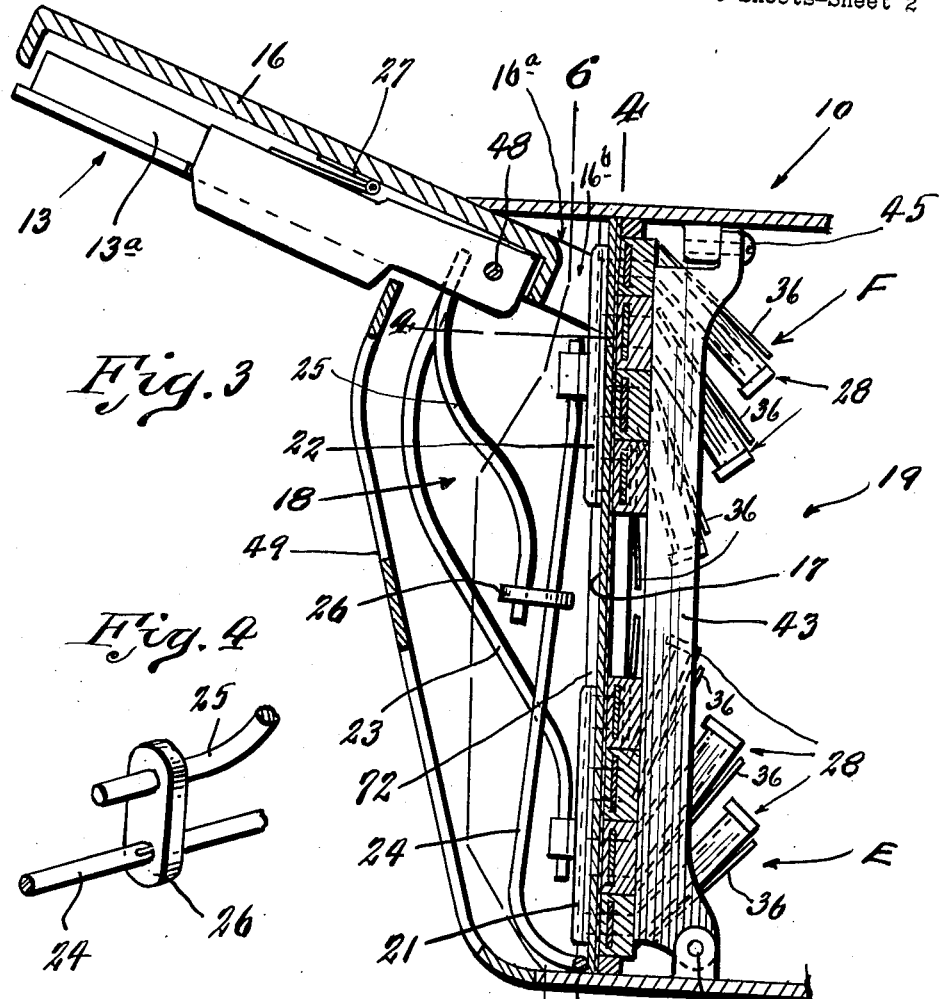
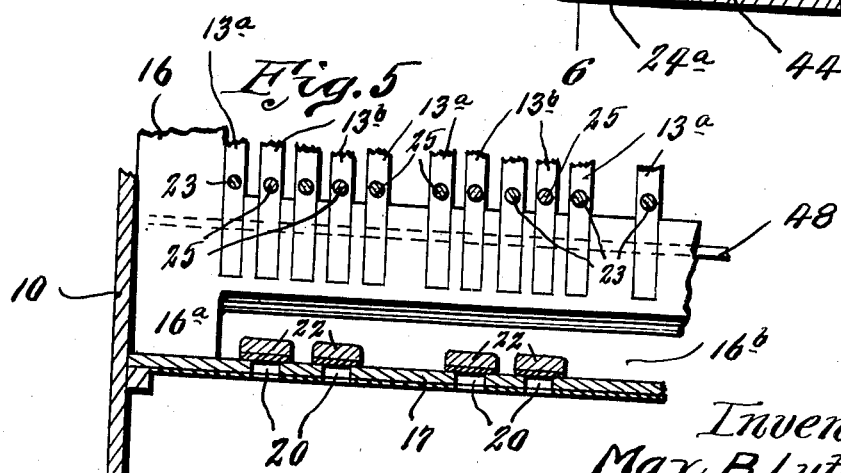

July 16, 1940.  M. B. LUTTBEG  2,208,038
ACCORDION
Filed Feb. 10, 1938   6 Sheets-Sheet 3
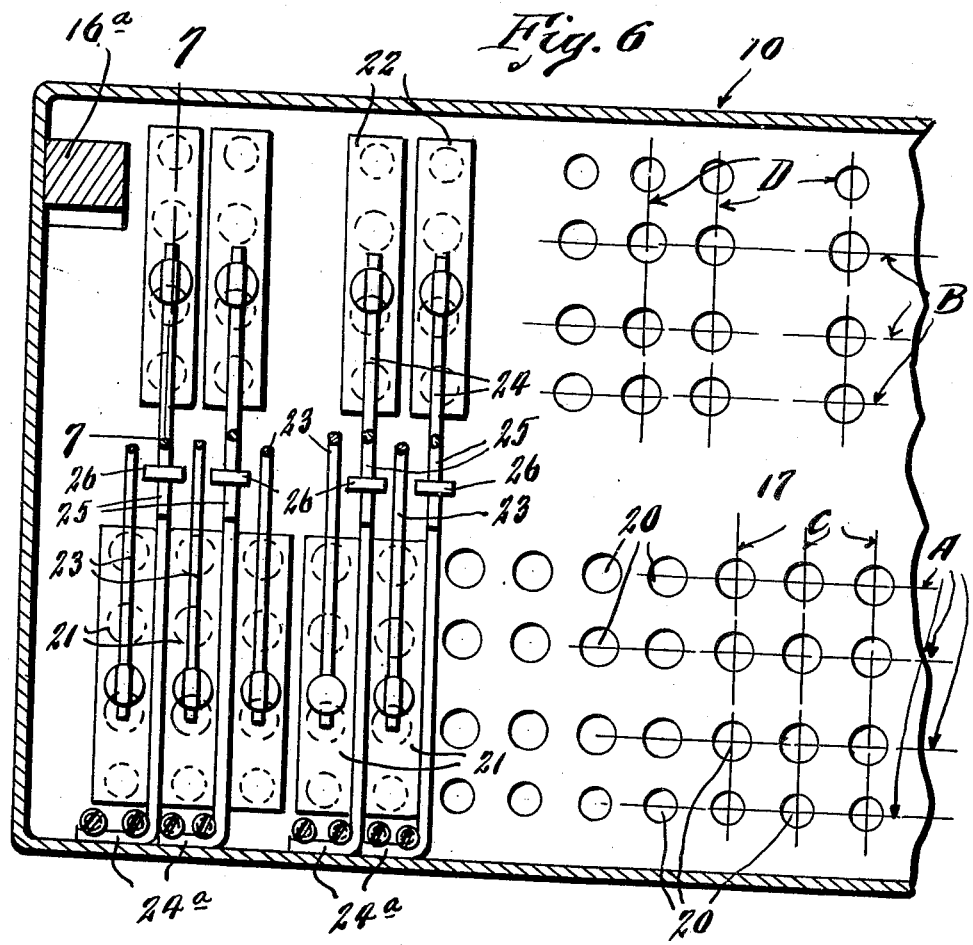
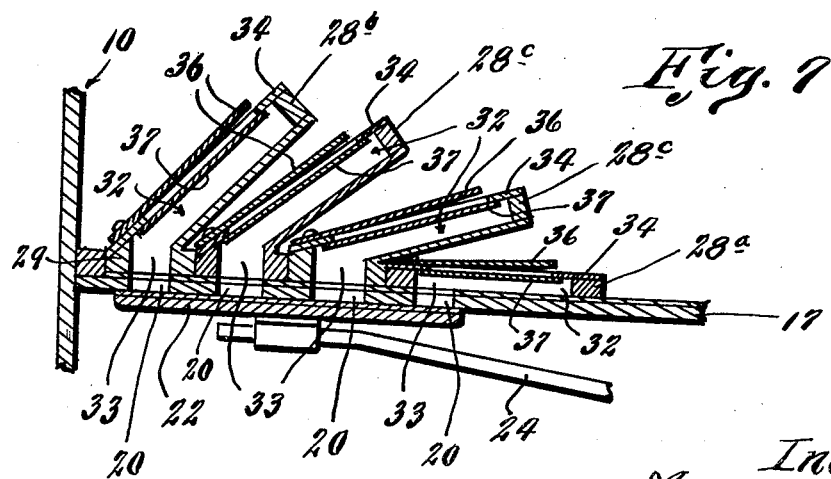
Inventor
Max B. Luttbeg
By William James Atty.

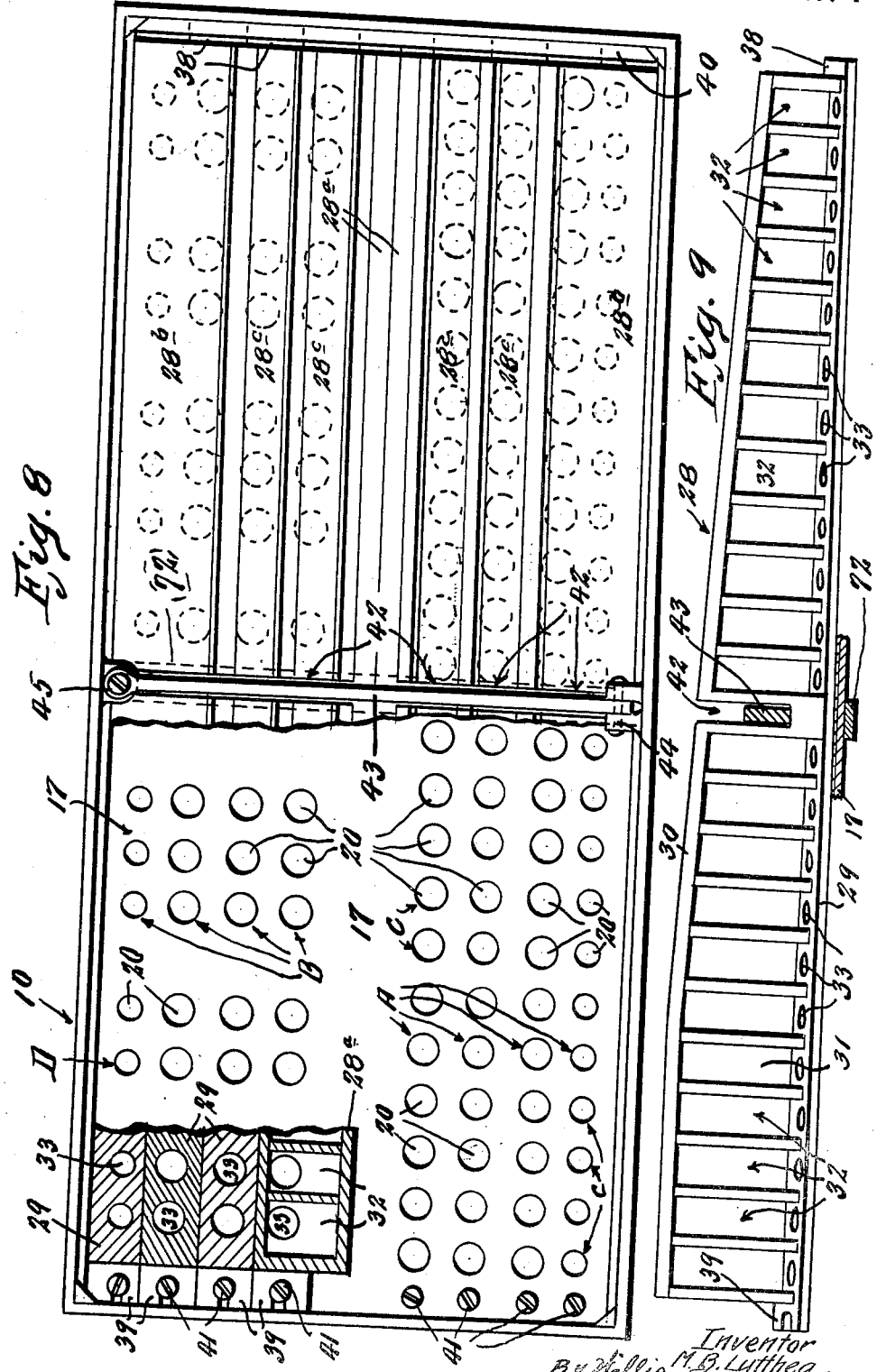

July 16, 1940.　　　M. B. LUTTBEG　　　2,208,038
ACCORDION
Filed Feb. 10, 1938　　　6 Sheets-Sheet 5

Inventor
Max B. Luttbeg
By William Janus,
Atty.

July 16, 1940.  M. B. LUTTBEG  2,208,038
ACCORDION
Filed Feb. 10, 1938   6 Sheets-Sheet 6
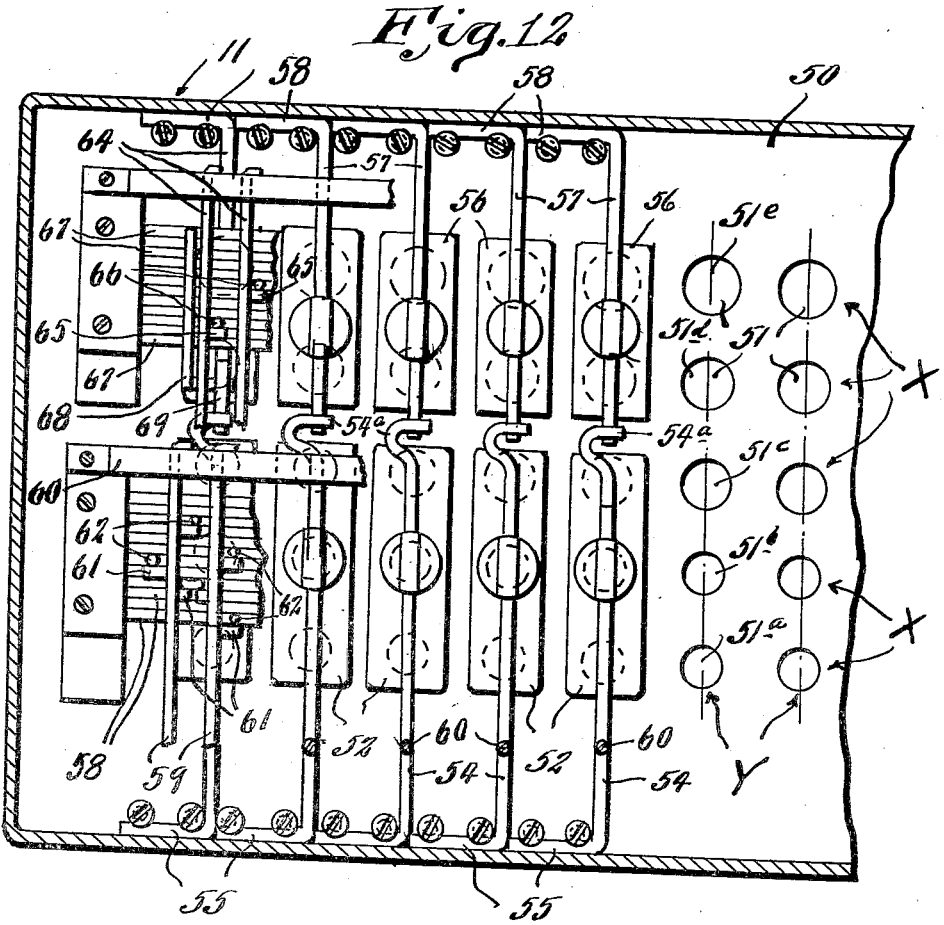
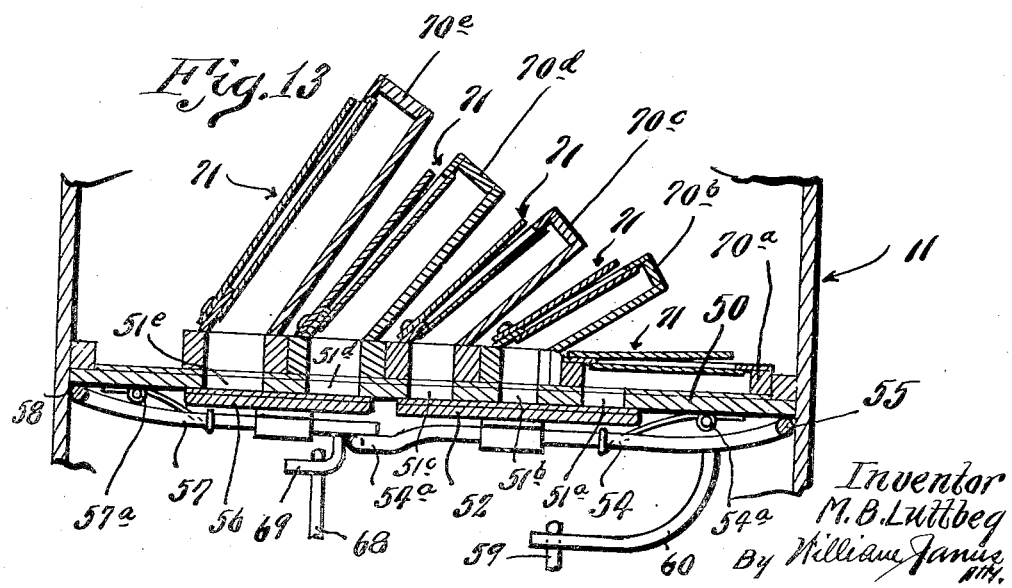
Inventor
M. B. Luttbeg
By William Janus Patented July 16, 1940

2,208,038

UNITED STATES PATENT OFFICE 2,208,038

ACCORDION

Max B. Luttbeg, St. Louis, Mo.

Application February 10, 1938, Serial No. 189,738

8 Claims. (Cl. 84—376)

This invention relates to new and useful improvements in accordions.

An accordion contains in each end section or box a plurality of reed trays. Each tray carries plates on which are fitted the reeds. Heretofore, these blocks or reed trays have been mounted perpendicular to the sound board or apertured wall of the end section in order to conserve the space. Due to the fact that each reed is disposed at right angle to the axis of the aperture through which the air is admitted the air enters the reed chamber in a direction parallel to the reed and does not act on the latter in an efficient manner and the reed does not produce the true tonal effects. Furthermore, as some of the reed trays are formed double the reeds of the adjacent trays face each other and the sound waves produced thereby interfere with each other and impair the tones produced by said reeds.

One of the objects of the invention is to mount the reed trays at an angle from the perpendicular with respect to the sound board so that the air enters each reed chamber at an angle to the reed and acts upon the latter with greater effect and in a more efficient manner, whereby the sound effects produced are richer and of the desired tonal qualities.

Another object of the invention is to form each reed tray with a single row of reed chambers and to position all of said trays in a spaced-apart fan-shaped relation with each other with the reeds of said trays facing all in the same direction so that the sound waves emanating from the reeds of one tray do not oppose or interfere with the sound waves of the reeds of the adjacent tray.

Another object of the invention is to arrange each set of reeds in a separate tray and to arrange said trays in a spaced-apart relation and inclined from vertical with respect to the base of the tray so that the reed chambers and the reeds thereof are disposed in a plane angular to the axis of the apertures arranged in said base, whereby the air is admitted into each reed chamber in a direction angular to the plane of the reed.

Another object of the invention is the provision of reed trays and clapper or valve mechanisms of improved construction, whereby the apertures for the sharps are spaced suitably from the apertures for the naturals on the sound board and the tones produced by the two groups are balanced and equalized and eliminate the preponderance of one set of notes over the other.

Another object of the invention is to provide a sound board of wood which is dense in structure and possesses excellent sound qualities, the wood preferable for this purpose being India mahogany, also formed vermilion wood.

Another object of the invention is to provide an improved means for securing the reed trays in position on the sound board.

Additional objects of the invention are to improve upon the key mechanism and provide a novel arrangement of reed trays whereby the tones of the naturals and sharps are equalized and finer and louder tones are produced.

With these and other objects in view, my invention consists in certain novel features of construction and arrangement of parts, hereinafter more fully described and claimed, and illustrated in the accompanying drawings, in which—

Figure 3 is an enlarged transverse cross section taken through the treble section of the accordion.

Figure 4 is an enlarged perspective detail view of one of the clapper connections.

Figure 5 is a fragmental cross section taken on line 5—5 of Figure 3.

Figure 6 is a cross section taken on line 6—6 of Figure 3.

Figure 7 is an enlarged cross section taken on line 7—7 of Figure 6.

Figure 8 is an elevation, partly in cross section, of the tray side of the treble section.

Figure 9 is a side elevation of one of the trays with the reeds removed therefrom.

Figure 12 is a fragmental cross section through the bass section of the accordion.

Figure 13 is an enlarged cross section taken on line 13—13 of Figure 12.

Figure 1:
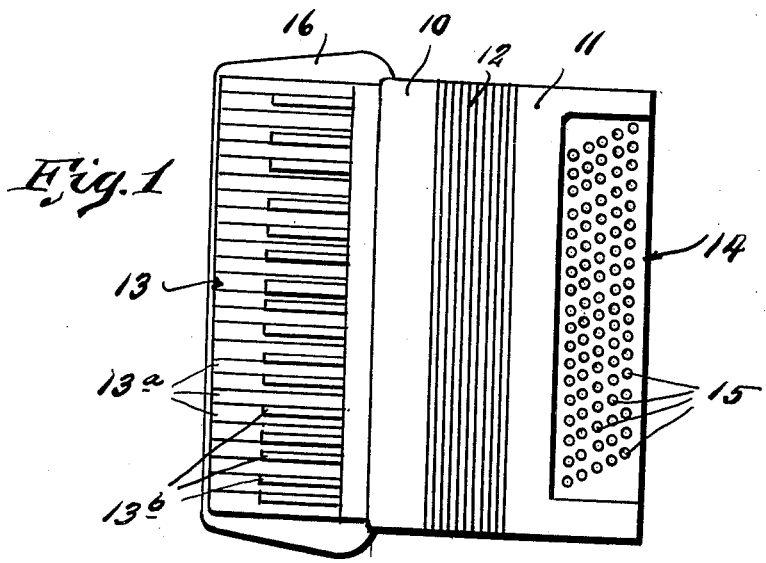
Figure 1 is a front elevation of my improved accordion.
Figure 2:
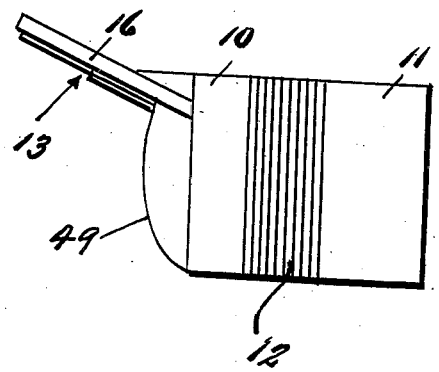
Figure 2 is a top plan view of same.
Figure 10:
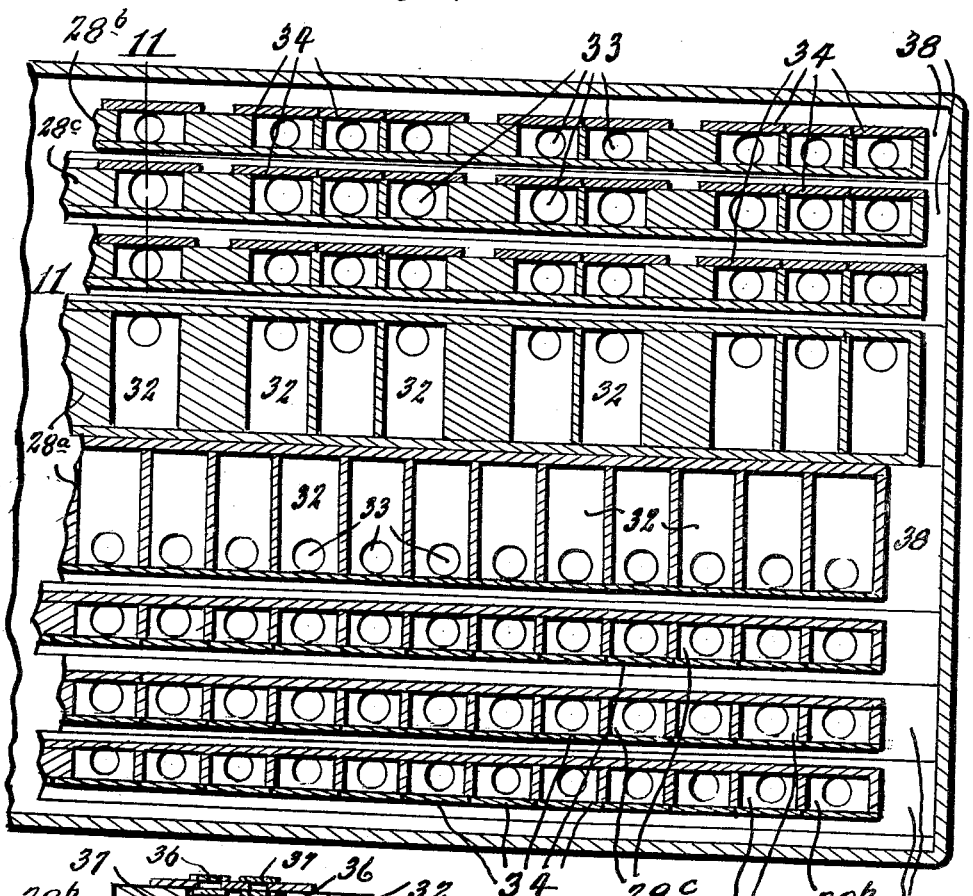
Figure 10 is a fragmental cross section taken through the tray side of the treble section.

Referring by numerals to the accompanying drawings, the accordion consists of a treble section 10, a base section 11, and a bellows 12, the latter extending between said sections.

The treble section contains a keyboard 13 and the bass section contains a keyboard 14 having buttons or keys 15. If desired, a piano keyboard could be used in place of keys 15.

The treble section 10 is box-shaped and includes a sloping wall 16 on which the keyboard 13 is arranged. It also includes a sound or clapper board 17 which separates the clapper chamber 18 from the bellows chamber 19. The board 17 is formed with a plurality of apertures 20 which provide communication between said chambers.

These apertures 20 are arranged in a series of four longitudinal rows A arranged adjacent to one side of the section 10 and four longitudinal rows B arranged adjacent to the opposite side of said section. Thus the two groups of rows are spaced suitably from each other and a substantial portion of the sound board intermediate said groups is formed imperforate and insures better sound qualities. The rows A are for the naturals and the rows B are for the sharps.

The apertures of each row A are arranged in transverse rows with apertures of the other rows A as indicated at C and the apertures of each row B are disposed in transverse rows with apertures of the other rows B, as indicated at D. Closing each transverse row E of apertures 20 is a clapper or valve 21 and similarly a clapper or valve 22 closes each transverse row D of the sharps.

The valves 21 and 22 are arranged in the clapper chamber or on the outer side of the sound board 17 as shown in Figure 3. Each valve 21 is carried by the outer end of a rod 23, the inner end of which extends toward the sloping board 16 and is fixed to a corresponding natural key 13a. Thus when one of the natural keys is depressed a corresponding valve 21 is raised to open one of the transverse rows C of apertures 20.

Each valve 22 is mounted on one end of a rod or arm 24, which latter extends across sound board 17 and over valves 21 and has its end 24a pivoted on said sound board near the corresponding side wall of section 10. A rod or arm 25 is fixed at one end to each sharp key 13b and extends forwardly and has its outer end terminating above and intermediate the corresponding rod 24 to which it is connected by a short coupling or link 26. This link is formed of leather or other like material and is preferably fixed to the lower arm 24 and has a sliding engagement with the end of arm 25. When one of the sharp keys 13b is depressed a corresponding valve 22 is raised and opens one transverse set D of apertures. A spring 27 is arranged under each key 13a and 13b and serves to raise said keys and maintains the respective valves in closed positions.

The lower edge of the sloping wall 16 is cut away intermediate its ends 16a, as indicated at 16b, to provide operating clearance for the valves 22.

On the inner or bellows side of the sound board 17 are fixed reed trays 28 arranged in two groups, naturals E and sharps F. The reed trays are disposed longitudinally of the section 10, there being a reed tray for each longitudinal row A and B of apertures 19. As shown, the reed trays are not set perpendicular to the sound board but each is disposed at an angle to the perpendicular, being inclined inwardly.

Preferably the innermost trays of each group are disposed horizontally, as indicated at 28a, the outermost trays 28b being set at about 45 degrees while the remaining trays 28c are disposed about equidistant therebetween. However, the outer trays 28b can be set nearly perpendicular or only a few degrees from perpendicular, if so desired.

Each tray 28 consists of a base 29, a top 30, and rear wall 31, and a plurality of transverse reed chambers 32. The base 28 is formed with a plurality of apertures 33 which correspond in sizes and spacing to the apertures 20 of the corresponding rows A or B of the sound board and each of the apertures 33 opens into a corresponding reed chamber 32. The base of each tray is disposed horizontally so that it lies flat on the sound board. The width of each base is so proportioned that they butt against each other and automatically space themselves in proper relation on the sound board.

Each reed chamber 32 is closed by a plate 34 having two elongated reed openings 35 for each chamber 32. Each of these openings has arranged on one side a reed 36 and on the other side the usual closure member 37, the reed and closure member of one opening being disposed on the opposite sides with respect to the corresponding elements of the other opening so that one reed of each reed chamber is operated both on the expansion and the compression of the bellows.

It will be noted that the reeds of all the trays of each group are arranged to face in one direction, namely, outwardly toward the respective side wall. Thus the tones produced by naturals are directed to one side of the section and the tones of the sharps are directed to the other side or in the opposite direction.

This arrangement serves to preserve the true tone qualities of the two groups and eliminates interference with each other.

The trays 28 are removably held in place. The ends of the base of each tray are extended, as indicated at 38 and 39. The ends 38 fit under an overhanging shoulder 40 formed by one of the end walls of section 10 and the end 39 is bifurcated and is secured to the sound board by a screw 41.

In order to insure a close engagement between the sound board and the trays, each of the latter is formed intermediate its ends with a transverse upwardly opening notch 42 which extends close to the base of the tray. The notches of all of the trays are aligned with each other. A bar or clamp 43 extends transversely of the sound board 17 and said trays and lies in said notches and bears against the bottoms thereof so as to force the tray bases firmly against the sound board. One end of said base is pivotally mounted, as indicated at 44, to one side of the section 10 and the other end of said bar is secured to the other side of said section by a screw 45.

The tray or bellows side of the sound board 17 has the usual lining 46 of soft skin or other suitable material. The attaching means are applied to the trays only at the bases thereof and consequently there is no danger of tipping the trays and an air-tight engagement between the sound board and the trays is maintained at all times. Preferably each tray is provided with the usual slide plate 47, as shown in Figure 3.

The keys 13 and 13b are pivotally mounted on board 16 by a single pivot member 48 which extends the full length of said board. The valve or clapper chamber 18 is enclosed by a suitable vertical member 49 in the usual manner.

The bass section 11 has a sound board 50 in which are arranged apertures 51 disposed in five longitudinal rows X and the apertures of each row X are in a transverse alignment with the apertures of the other longitudinal rows, thereby forming a plurality of transverse rows Y. Two clappers or valves are used for each row Y.

The first clapper 52 is carried by a rod 54 which is pivotally mounted at its outer end adjacent to one of the side walls of section 11, as indicated at 55. This clapper controls the first three apertures of row 5, namely, 51a, 51b and 51c.

A second clapper 56 is carried by a rod 57 whose outer end is pivotally mounted adjacent to the opposite side wall of section 11, as indicated at 58. This clapper controls the last two apertures 51d and 51e of row Y. The inner or free ends of rods 54 and 57 overlap the end of the former, being disposed laterally and above the end of the rod 57, as indicated at 54a. Thus clapper 52 can be operated to open the first three apertures without actuating clapper 56. However, the actuation of clapper 56 automatically operates clapper 52 into open position.

The mechanism for operating these clappers may be the same as that now used in the art and is actuated by keys or buttons 15 of the bass section 11. Briefly described, it consists of horizontally disposed rods or rock shafts 58 pivotally mounted in said section above clappers 52 and extending longitudinally in said section. Each of these shafts operates one of said clappers by means of an extension 59 which terminates transversely of and under a hook 60 fixed to the respective rod 54. Thus when one of said rods or shafts 58 is rocked it raises by means of its extension the appropriate clapper 52.

Each rod 58 is operated by a plurality of buttons 15. Each button operates a horizontally disposed push rod 59, the inner end of which is slidably mounted in a cross piece 60. These rods are disposed above and transversely of rock shafts 58 and each push rod 59 has one or more horizontally and laterally projecting pins 61, each of which lies in front of a pin 62 fixed to and projecting upwardly from a corresponding rock shaft 58. Thus the operation of a selected button actuates a predetermined rock shaft 58 and moves a corresponding clapper into open position.

The operation of clappers 56 is similar, the appropriate button 15 operating a push rod 64 which through a laterally and horizontally projecting pin 65 operates an upwardly projecting pin 66 on one of the horizontally disposed rock shafts 67. An extension 68 on each of said rock shafts engages a hook 69 of the corresponding rod 57 and operates the clapper carried by said rod.

A spring 54a engages each rod 54 and holds the clapper 52 in closed position, and a similar spring 57a engages each rod 57 and yieldably holds clapper 56 in closed position.

Arranged on the inner or bellows side of the sound board 50 are five reed trays, one tray for each row X. The first tray 70a is in engagement with row of apertures 51a and is disposed horizontally. The remaining trays 70b, 70c, 70d, and 70e are disposed at various angles substantially in the same manner as trays 58 and are in engagement with the apertures of the respective rows 51b, 51c, 51d and 51e. The reed sides 71 of said trays are all presented in one direction, as shown in Figure 13.

Figure 11:
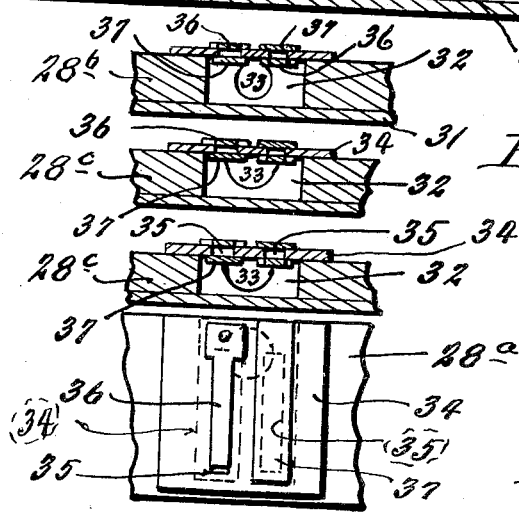
Figure 11 is an enlarged cross section, partly in elevation, taken on line 11—11 of Figure 10.

As is well known in the art, there are two openings 35 and two reeds 36 for each reed chamber, as shown in Figure 11. One reed is arranged on the outer side and the other reed on the inner side of the plate so that one reed operates on the compression and the other on the expansion of the bellows. Closure members 37, preferably made of thin leather or other soft pliable material, operate to close the respective opening 35 when the corresponding reed is to be inactive. The plates 34 are made of metal, preferably of brass or aluminum.

The innermost reed trays or blocks are disposed horizontally on the soundboard, as indicated at 28a in Figure 7 and at 70a in Figure 13. If desired, all of the reed trays or blocks may be laid horizontally by arranging different spacing of the clapper apertures 20. The inclined or horizontal positions of the reeds permit the air to strike against the side of the reed and to act with full force upon it. This produces finer and louder tones.

The arrangement of the clapper apertures and of the corresponding reed trays in two groups spaced from each other leaves a substantial large imperforate central portion on the sound board, thereby increasing the resonance of the board. Each tray consists of a single file or row of reeds thereby enabling the trays to be so positioned that the reeds of all the trays of a particular group face in one direction so that the sound waves of the reeds of one tray do not interfere with the sound waves of the other trays. The grouping or spacing of the sharps and naturals away from each other and facing the reeds of the two groups in opposite directions prevents interference between the tones of the two groups and produces more perfect tones which are equalized or balanced with each other.

The reed plates 34 are preferably made in separate pieces for each reed chamber 32, but if desired two or more reed plates 34 can be combined in one piece.

Preferably the clapper side of the sound board 17 has fixed thereto a strip 72 which extends transversely thereof and is disposed opposite to the clamping bar 43, as shown in Figure 9. Thus strip 72 reinforces said board at the point at which pressure is applied by bar 72.

The leather piece 26 connecting the rods 24 and 25 forms a flexible connection which eliminates noise and jarring of the parts. The end of rod 25 can move easily and noiselessly through said piece 26 and the latter being flexible readily adapts itself to the two rods so that no delicate fitting is required.

The use of vermilion wood, sometimes called India mahogany, for the sound board enhances the sound qualities thereof and at the same time provides strong and durable material which can be readily worked.

While I have shown and disclosed herein the preferred form of my invention it is obvious that minor changes may be made and substituted for those herein shown and described without departing from the spirit of my invention.

I claim:

1. In an accordion the combination of a reed tray comprising a base and a reed chamber member extending outwardly from said base at an angle from the vertical, said reed chamber member having intermediate its ends an outwardly opening slot, the bottom of which is disposed near said base, means for securing each end of said base, and a clamp extending transversely of said reed chamber member and of said slot and bearing against the bottom thereof for clamping said tray intermediate the ends thereof adjacent to said base.

2. In an accordion, an end section including a sound board, a plurality of reed trays on said sound board, means for securing the ends of each reed tray in position, each reed tray having formed intermediate its ends a transverse seat, the bottom of which is disposed close to said sound board, and a bar movably mounted at one end to one of the side walls of said end section and extending transversely and engaging the seats of all of said trays and clamping the latter against said sound board intermediate the ends of said reed trays at a point near the base thereof, and means for securing the other end of said bar to the other side wall of said section.

3. In an accordion, an end section including a sound board provided with apertures extending therethrough, said apertures being disposed in eight longitudinal rows arranged in two equal groups spaced from each other to leave a substantial central portion of said sound board imperforate, and a double set of reed trays fixed to one side of said sound board and spaced in two groups corresponding to the groups of said apertures, said reed trays being disposed angularly to said sound board and to each other, the reed faces of the trays of each group facing in one direction.

4. In an accordion, an end section including a sound board provided with apertures extending therethrough, said apertures being disposed in longitudinal rows arranged in two groups spaced longitudinally from each other to leave a substantial central portion of said sound board imperforate, and a double set of reed trays fixed to one side of said sound board and spaced in two groups corresponding to the groups of said apertures, said reed trays being disposed angularly relatively to each other, the reed faces of the trays of each group facing in a direction opposite to the reed faces of the trays of the other group.

5. In an accordion, an end section including a sound board provided with a plurality of apertures extending therethrough, said apertures being disposed in longitudinal rows spaced longitudinally from each other to leave a substantial central portion of said sound board imperforate, and a double set of reed trays fixed to one side of said sound board and arranged in two groups corresponding to the groups of said apertures, said reed trays being disposed angularly relatively to each other, the trays of each group being inclined inwardly of said section and the reed faces of the trays of each group being presented outwardly.

6. In an accordion, a clapper, an arm pivotally mounted at one end and having its other end fixed to said clapper, a key, a rod extending outwardly from said key above said arm and parallel therewith, and a leather piece fixed to said arm and to said rod to form flexible operative connection therebetween.

7. In an accordion, a clapper, an arm pivotally mounted at one end and having its other end engaging said clapper, a key, a rod fixed to and extending therefrom and spaced from said arm, and a short section of flexible non-metallic material having one end slidably mounted on said rod and having its other end fixed to said arm to form operative connection therebetween.

8. In an accordion, the combination with two longitudinally spaced-apart rods, of a flat piece of leather apertured at its ends, one end being slidably engaged with one of said rods and the other being fixed to the other rod.

MAX B. LUTTBEG.